UNITED STATES PATENT OFFICE.

JOHN C. FLEMING, OF BOSTON, MASSACHUSETTS.

FOOD PRODUCT.

1,211,124.

Specification of Letters Patent.  Patented Jan. 2, 1917.

No Drawing.  Application filed May 23, 1916.  Serial No. 99,877.

*To all whom it may concern:*

Be it known that I, JOHN C. FLEMING, a citizen of the United States, residing at Boston, in the county of Suffolk and State of Massachusetts, have invented new and useful Improvements in Food Products, of which the following is a specification.

This invention is a food product in powdered, tablet, or other suitable form.

The object of the invention is to provide a food compound composed of fish and vegetables, reduced to powder, or compressed into tablet form, and capable of being mixed with suitable quantities of water to produce fish cakes, fish chowder, or the like, as the taste may dictate, and to retain the full nutritive value thereof unimpaired.

To produce the improved food compound forming the invention, fish of any desired description, after being thoroughly cleansed, is placed within a closed receptacle, with any preferred quantity of peeled potatoes. The bones of the fish may or may not be removed, as desired. While within said receptacle the articles are subjected to the direct action of steam, under pressure until thoroughly cooked and digested, the action of the steam being such that the fish and vegetables become thoroughly intermingled. After the ingredients are completely cooked and digested, as described, they are dried in suitable manner, until sufficient moisture is separated therefrom to permit the mass to disintegrate into comminuted or powder form, having its food value unchanged. If desired, the powder thus produced may be compressed into tablets. The dried and comminuted compound may be placed in boxes or other packages, or protected from the atmosphere in any other preferred manner.

The relative proportions of fish and potatoes may be varied, the invention not being limited in this particular, and if desired onions, or other flavoring ingredients may be added, as taste may dictate, or the trade may demand. Either fresh or salt fish may be employed. If fresh fish are used, salt should be added, but irrespective of whether fresh or salt fish is used, the amount of salt in the whole compound should not exceed what may be fairly balanced by the amount of water required to put the mixture in the form of fish cakes, or of fish chowder, ready for cooking.

The removal of the bones from the fish is rendered unnecessary by reason of the fact that they will disintegrate under the steam pressure and readily commingle with the rest of the ingredients, thereby adding a food constituent of high value, which may be readily digested by the weakest stomach, without the least derangement or disturbance.

It will be readily understood that the improved food powder or tablet herein described, will supply a natural food, composed of vegetables with all of the edible properties of the fish, and will retain its food value indefinitely, being capable of ready conversion for domestic use by the admixture of a suitable quantity of water. The natural freshness and flavor of the ingredients of the compound, are preserved with all of the nutritive value thereof, and by utilizing the bones of the fish, a valuable food component, heretofore purposely eliminated in the cooking of fish, is retained, and in a condition which will not in any way detract from the nutritive value or the digestibility of the compound.

I claim as my invention:—

1. A food product comprising a cooked mixture of fish and a vegetable in a dry, comminuted condition.

2. A food product comprising a cooked mixture of fish and a vegetable in a dry, comminuted condition, and including the bones of the fish.

3. A food product comprising a cooked mixture of fish and a vegetable in a dry, comminuted condition, and including a flavoring ingredient.

4. A food product comprising a cooked mixture of fish and a vegetable in a dry and comminuted condition, compressed into tablet form.

In testimony whereof I have hereunto set my hand.

JOHN C. FLEMING.